United States Patent [19]

Maeda et al.

[11] Patent Number: 4,541,083
[45] Date of Patent: Sep. 10, 1985

[54] FOR JUMPING A LIGHT SPOT ON A TRACK OF A RECORDING MEDIUM

[75] Inventors: Takeshi Maeda; Motoo Uno, both of Kikubunji; Masahiro Takasago, Odawara, all of Japan

[73] Assignee: Hitachi, Ltd., Tokyo, Japan

[21] Appl. No.: 446,251

[22] Filed: Dec. 2, 1982

[30] Foreign Application Priority Data

Dec. 4, 1981 [JP] Japan ................... 56-194518

[51] Int. Cl.³ ............................................. G11B 21/10
[52] U.S. Cl. .................................. 369/44; 369/33; 369/46; 360/77
[58] Field of Search ............. 369/44, 46, 32, 33, 369/41; 360/10.1, 77; 358/342, 312

[56] References Cited

U.S. PATENT DOCUMENTS

4,037,252  7/1977  Janssen .................. 369/46
4,057,832 11/1977  Kappert ................. 369/46
4,234,837 11/1980  Winslow ................ 360/77

Primary Examiner—Raymond F. Cardillo, Jr.
Assistant Examiner—Alan K. Aldous
Attorney, Agent, or Firm—Antonelli, Terry & Wands

[57] ABSTRACT

In a light spot control signal generating device, a light spot is irradiated on a recording medium having tracks on which information is recorded. In order to jump the light spot from a track being scanned thereby to an adjacent track, a signal representative of light quantity of reflection or transmission of the light spot and a track error signal are detected. The two signals are used to judge whether the light spot has passed through an edge of the track. The track error signal is also used to detect a signal representative of an instant at which the light spot is present at the middle point between adjacent tracks, and this signal is used as a timing signal for changing the polarity of a control signal applied to a spot light deflector.

14 Claims, 49 Drawing Figures

FOR JUMPING A LIGHT SPOT ON A TRACK OF A RECORDING MEDIUM

CROSS-REFERENCES OF THE RELATED APPLICATIONS

This application relates to a U.S. application Ser. No. 443,399 entitled "Optical Memory Apparatus" filed Nov. 22, 1982 by Takeshi Maeda, Motoo Uno, Kougi Muraoka, Masahiro Takasago, Yasumitsu Mizoguchi, and Tokuya Kaneda and assigned to the present assignee, based on Japanese Patent application Nos. 56-187869 filed Nov. 25, 1981, and 57-50035 filed Mar. 30, 1982. The disclosure of the related application is incorporated in the disclosure of this application by reference.

BACKGROUND OF THE INVENTION

This invention relates to a device for generating a light spot control signal and more particularly to a device which generates a control signal for jumping a light spot from one track to another.

An optical reader or a so-called light disk apparatus has hitherto been proposed wherein a light spot such as a laser beam serving as a read beam is irradiated on a disk-shaped recording medium having a spiral track or concentric tracks on which information is recorded in the form of topographical irregularities responsible for change of reflection factor, and the information is read by detecting changes in light quantity of reflection or transmission light. In this type of light disk apparatus, there is required a control operation for jumping the light spot. For example, with a recording medium having a continuous spiral a portion of which is a spiral track recorded with a television signal, a still picture can be reproduced by jumping back a light spot radially over a length of one track each time the recording medium makes one revolution, namely, scanning an identical track with the light beam during a required time interval. In another instance, a slow motion operation at a speed which is half the rated speed can be accomplished by jumping back the light spot radially over the length of one track each time the recording medium makes two revolutions. With a recording medium having a great number of concentric tracks, a light spot is caused to jump radially from one track to another.

One example of such a jump control method is disclosed in Japanese Patent application Laid-Open No. 52-26802. This jump control method will be described with reference to FIG. 1 which illustrates at sections (a) through (c) a track error signal waveform, a control signal waveform and a cross-sectional form of tracks. In this jump control method, based on the fact that a track error signal $E_1$ representative of a displacement between a light spot and a track becomes zero, as shown at A' and C', at centers A and C of tracks and, as shown at B', in the middle of adjacent tracks, the polarity of a control signal $E_2$ is changed by detecting the point B' at which the track error signal becomes zero, a time interval T required for excursion of the track error signal from point A' to point B' is measured, and a duration time T' of the inverted-polarity pulse is made equal to T. The control signal $E_2$ thus obtained is applied to a tracking device such as a deflector.

Incidentally, when the deflector is driven by application of a pulse of a pulse height or pulse level $E_A$ to move the light spot present at point A to point B, the light spot begins to move toward point B. However, such a movement of the light spot is adversely affected by local friction in the deflector or irregular sensitivity of the deflector to a drive voltage (or drive current) for making a deflection angle, and it happens that the light spot fails to move or it returns to the point A in the course of its movement toward the point B. Even with a deflector not raising the above problem, a similar phenomenon occurs when the disk per se is moved in opposition to the light spot under the influence of external vibrations. In such an event, the aforementioned method which merely detects the zero point of the track error signal is unaware of the return of the light spot.

SUMMARY OF THE INVENTION

To obviate the above problem, the object of the present invention is to provide a device for generating a light spot control signal capable of assuring a steady jump control operation. Specifically, it is a major object of this invention to provide a light spot control signal device which can minimize the failure rate of the jump operation to improve reliability of the jump operation. To accomplish the above object, according to the invention, a middle point between adjacent tracks is detected while detecting a current position of a light spot by utilizing a signal representative of a light quantity of a light beam after irradiation thereof on a recording medium (hereinafter referred to as a light quantity signal) and a track error signal, and the polarity of a control signal is changed by a signal representative of the middle point to cause the light spot to reach a target track. Even in the event that the light spot accidentally returns in the course of a jump operation, the return of the light spot is detected to restart the jump operation.

DESCRIPTION OF THE PREFERRED EMBODIMENTS

Figure 2:
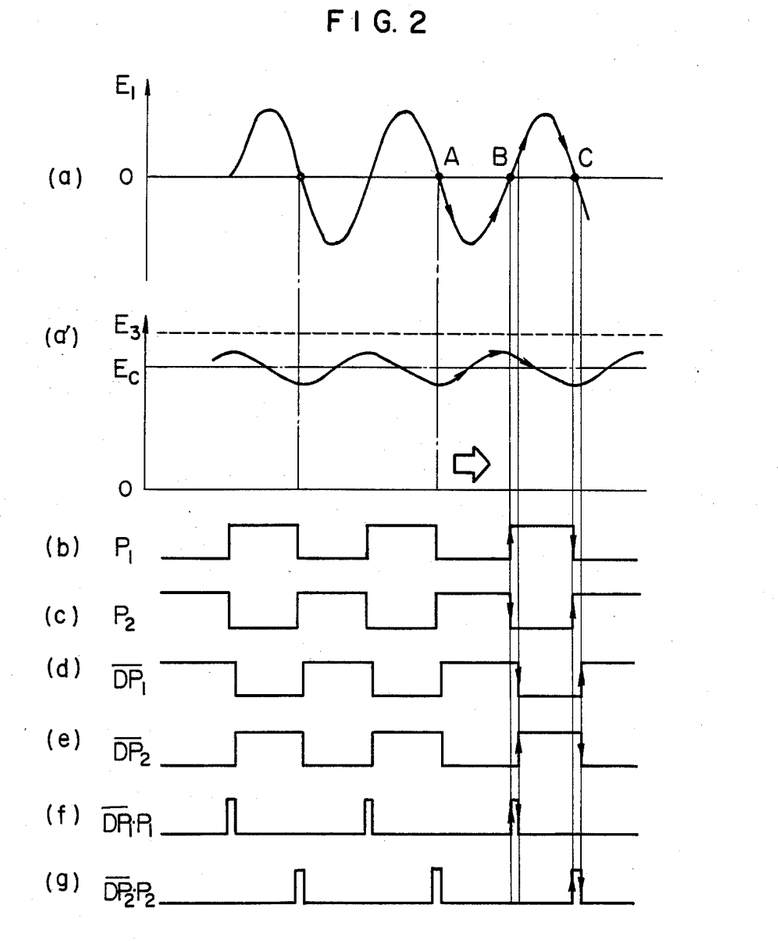
FIGS. 2 and 3, both consisting of a, a' and b–g, are waveform diagrams useful in explaining the operation of a light spot control signal generating device embodying the invention.
Figure 3:
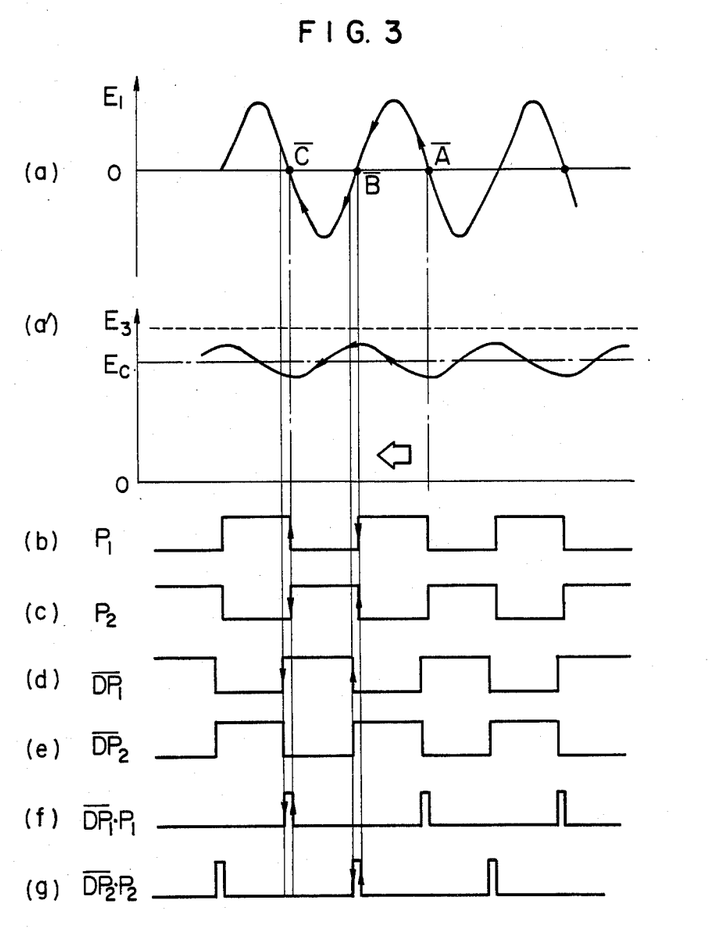

Referring to FIGS. 2 and 3, there are shown waveforms useful in explaining the operation of a light spot control signal generating device embodying the invention. A track error signal $E_1$ occurring when a light spot runs across tracks is illustrated at a waveform (a) in FIG. 2 or FIG. 3, and the corresponding change of a light quantity signal $E_3$ is illustrated at a waveform (a') in FIG. 2 or FIG. 3. In particular, FIG. 2 shows a case wherein the light spot runs across a disk from an outer side to an inner side with respect to a substantially radial direction of the disk and conversely, FIG. 3 shows a case wherein the light spot runs across the disk from the inner side to the outer side. The track error signal $E_1$ can be obtained through various methods well known in the art. For example, there are available a method using two sub-spots as disclosed in Japanese Patent application Laid-Open No. 49-50954, a method based on spot warbling as disclosed in Japanese Patent application Laid-Open No. 49-94304, a method based on track warbling as disclosed in Japanese Patent application Laid-Open No. 50-68413, and a method using a diffraction light beam as disclosed in Japanese Patent application Laid-Open No. 49-60702. Any of these methods may be applicable to the present invention but will not be detailed herein. A disk dedicated to reproduction is recorded in advance with tracks at equal pitches and times required for a light spot to run across any adjacent tracks are substantially equal to each other on average. For the tracks at equal pitches, a track error signal $E_1$ changes sinusoidally as shown by section (a) in FIG. 2 or FIG. 3 when the light spot runs across the tracks. The quantity of light from the disk so changes as to be minimized at the center of a track and maximized in the middle of adjacent tracks as shown by section (a') in FIG. 2 or FIG. 3. The light quantity is received by a photodetector and converted into an electrical signal $E_3$ which has the same period as the track error signal $E_1$ but is shifted in phase by 90°. Further, the sinusoidal component of the signal $E_3$ is superimposed on a bias component $E_c$. The waveform (a') as shown in FIG. 2 or FIG. 3 can be established if the track pitch and width are properly related to the diameter of light spot for reproduction. In an ordinary light disk dedicated to reproduction, recording density and resolution are conditioned to satisfy the proper relation, which will not therefore be described herein. The quantity of light from the disk referred to herein means a quantity of reflection light from the disk or transmission light therethrough which is focused by a lens of a specified numerical aperture and passed through an aperture of the lens, and it may be called a total light quantity. Accordingly, the light quantity signal $E_3$ can be obtained by irradiating a light beam passing through the lens aperture on a light receiving surface of a single photodetector and converting the same into a photocurrent, by irradiating a light beam on a plurality of divided light receiving surfaces of a set of photodetectors and totalizing photocurrents from the respective photodetectors, or by converting the photocurrents into voltages and adding these voltages. The light quantity signal $E_3$ can be used as a signal for detecting information recorded on the tracks.

A signal representative of an instant at which the light spot is present at the middle of adjacent tracks can be obtained from the track error signal $E_1$ in a manner as will first be described below.

The signal $E_1$ is applied to one comparator to produce a signal $P_1$ as shown at (b) in FIG. 2 or FIG. 3. The signal $E_1$ is also applied to another comparator to produce a signal $P_2$ as shown at (c) in FIG. 2 or FIG. 3. The signals $P_1$ and $P_2$ are opposite in phase and a rising portion and a falling portion of the signals $P_1$ and $P_2$ correspond to the zero point of the error signal $E_1$. These signals $P_1$ and $P_2$ are delayed by a proper time and inverted to produce inverted signals $\overline{DP}_1$ and $\overline{DP}_2$ as shown at (d) and (e) in FIG. 2 or FIG. 3. The inverted signal $\overline{DP}_1$ and the signal $P_1$ are ANDed to produce a pulse $\overline{DP}_1 \cdot P_1$ of a width equal to the delay time as shown at (f) in FIG. 2 or 3 at the zero point of the track error signal $E_1$. Similarly, the inverted signal $\overline{DP}_2$ and the signal $P_2$ are ANDed to produce a similar pulse $\overline{DP}_2 \cdot P_2$ as shown at (g) in FIG. 2 or 3.

When the light spot moves in a direction as shown at an arrow in FIG. 2, the pulse $\overline{DP}_1 \cdot P_1$ is produced at an instant at which the light spot is present at the middle (point B) between adjacent tracks. Accordingly, by the use of this pulse, it is possible to detect that the light spot moving in the arrow direction duly passes through the middle point between adjacent tracks.

When the light spot moves in the opposite direction as shown in FIG. 3, the pulse $\overline{DP}_2 \cdot P_2$, in place of the pulse $\overline{DP}_1 \cdot P_1$ in FIG. 2, is produced at the middle point B. Thus, by selecting one of the pulses $\overline{DP}_1 \cdot P_1$ and $\overline{DP}_2 \cdot P_2$ in accordance with the direction of jumping of the light spot, a signal representative of the fact that the light spot moving in the jumping direction duly passes through the middle point between adjacent tracks.

Figure 1:
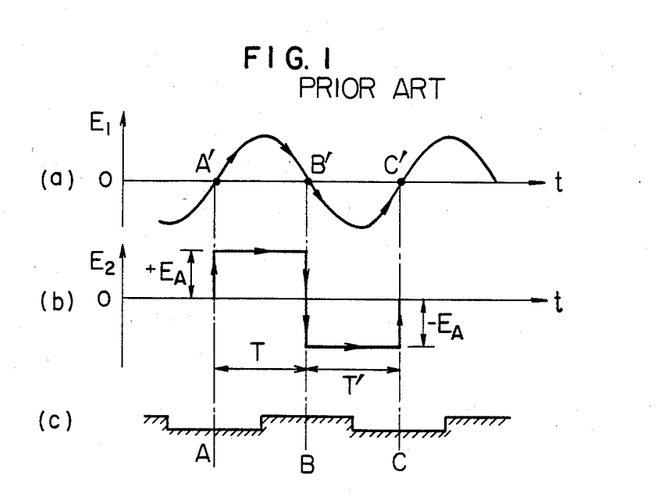
FIG. 1, consisting of a–c, is a waveform diagram useful in explaining the operation of a prior art jump operation method.

The thus obtained signal is used as a signal for changing the polarity of the control signal $E_2$ applied to the deflector described with reference to FIG. 1, that is, a timing signal for change from acceleration to deceleration.

Figure 4:
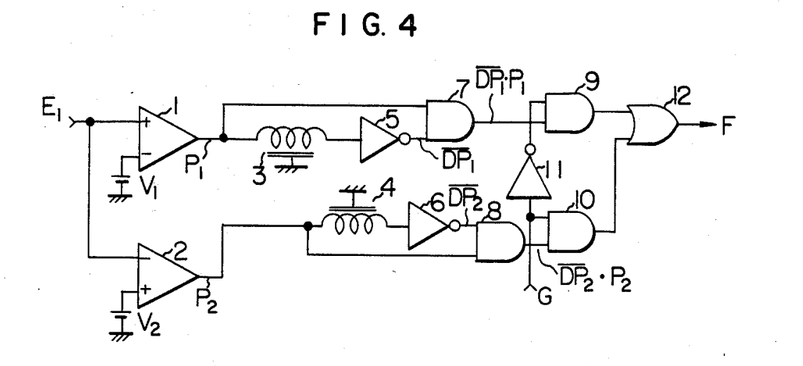
FIG. 4 is a circuit diagram of a detecting device forming part of the present invention.

FIG. 4 shows a circuit arrangement for implementation of the above operation. A comparator 1 has a (+) terminal supplied with the track error signal $E_1$ and a (−) terminal connected to receive a voltage $V_1$, and a comparator 2 has a (−) terminal supplied with the track error signal $E_1$ and a (+) terminal connected to receive a voltage $V_2$. The comparator 1 compares the signal $E_1$ with the voltage $V_1$ to produce the signal $P_1$, and the comparator 2 compares the signal $E_1$ with the voltage $V_2$ to produce the signal $P_2$. Preferably, the voltages $V_1$ and $V_2$ are of zero level but in view of noise contained in the signal $E_1$, they may preferably be set to be in excess of a noise level. The signals $P_1$ and $P_2$ are delayed by a proper time through delay lines 3 and 4 and then inverted at inverters 5 and 6 to produce the signals $\overline{DP}_1$ and $\overline{DP}_2$. The signals $P_1$ and $\overline{DP}_1$ are applied to an AND circuit 7 to produce the pulse $\overline{DP}_1 \cdot P_1$, and the signals $P_2$ and $\overline{DP}_2$ are applied to an AND circuit 8 to produce the pulse $\overline{DP}_2 \cdot P_2$. The pulse $\overline{DP}_2 \cdot P_2$ is applied to one input of an AND circuit 10 having the other input connected to receive a signal G representative of the polarity of jumping (for example, corresponding to a logic level "1" when the jumping from the inner side to the outer side is effected in the arrow direction in FIG. 3). The pulse $\overline{DP}_1 \cdot P_1$ is applied to one input of an AND circuit 9 having the other input connected to receive an inversion of the signal G via an inverter 11. An OR circuit 12 is then supplied with either a pulse $\overline{DP}_1 \cdot P_1$ or the pulse $\overline{DP}_2 \cdot P_2$ and it produces a pulse F representative of the fact that the light spot duly passes through the middle point B between adjacent tracks. This signal F is used as the timing signal for changing the polarity of the control signal $E_2$ applied to the light spot deflector.

Figure 5:
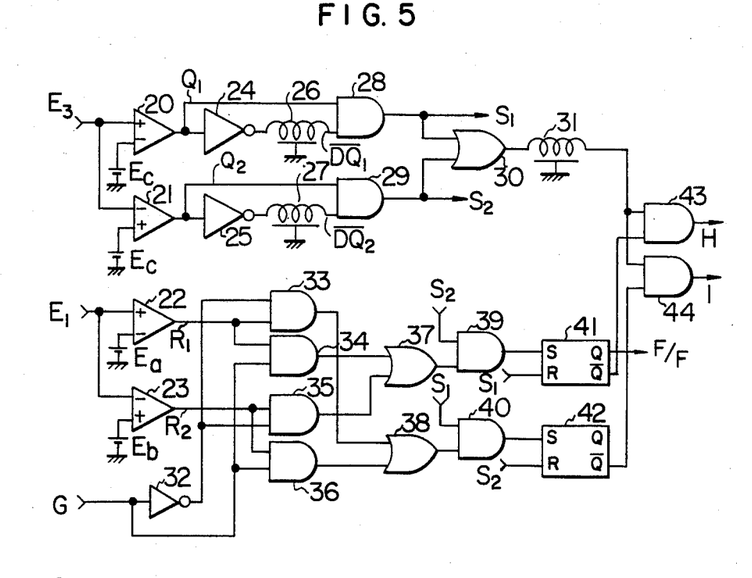
FIG. 5 is a circuit diagram, of another detecting device forming another part of the invention.

Another part of the invention will be described with reference to a circuit diagram of FIG. 5 and waveforms in FIGS. 6 and 7. A track error signal $E_1$ illustrated at section (a) in FIG. 6 or FIG. 7 corresponds to that shown at the waveform (a) in FIG. 2 or 3, and a light quantity signal $E_3$ illustrated by a waveform (a') in FIG. 6 or 7 corresponds to that shown by the waveform (a') in FIG. 2 or 3.

Figure 6:
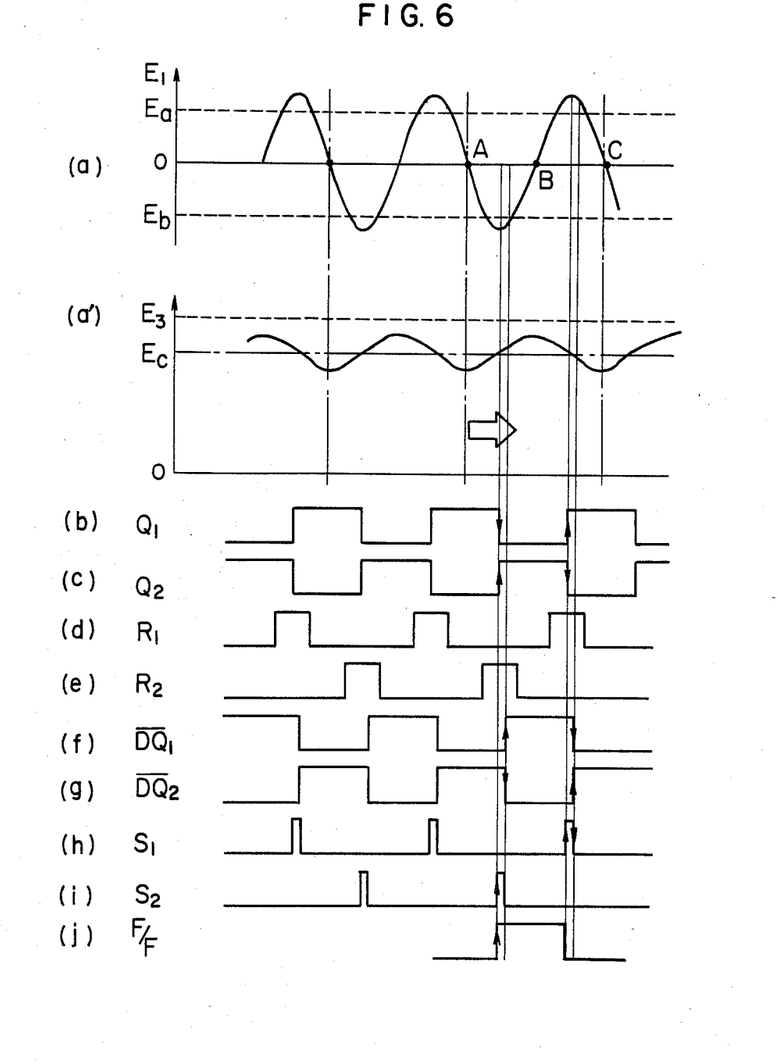
FIGS. 6 and 7, both consisting of a, a' and b–j, are waveform diagrams useful in explaining the operation of the detecting device of FIG. 5.
Figure 7:
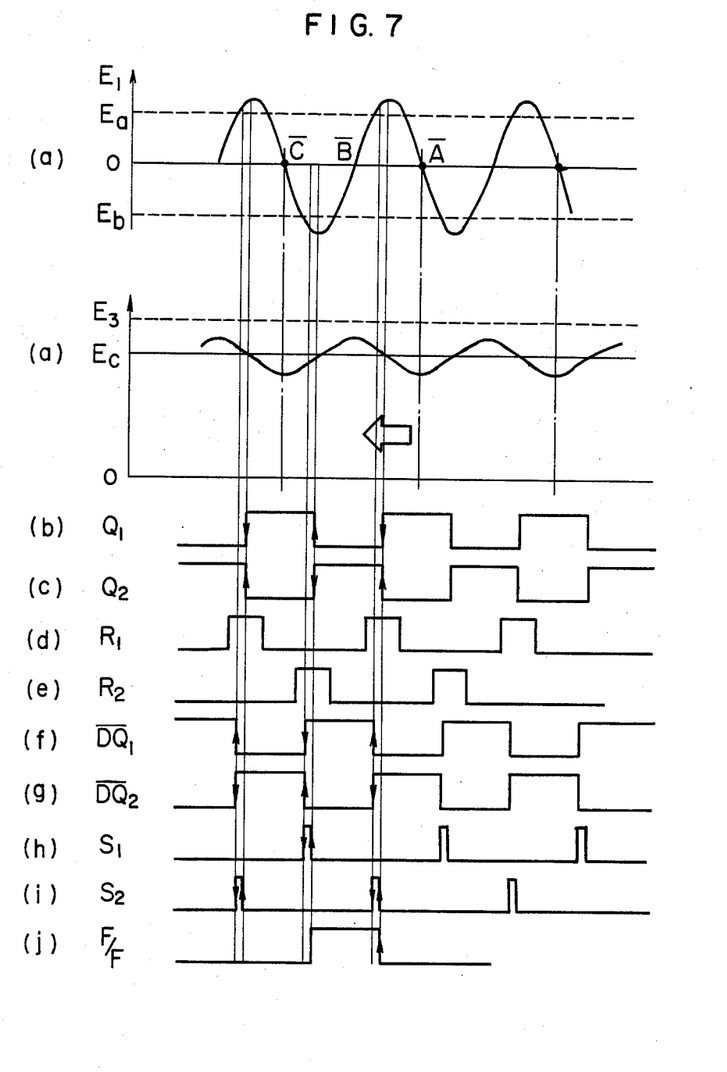

An average value $E_c$ of the light quantity signal $E_3$ and the signal $E_3$ are applied to a comparator 20 to produce a signal $Q_1$ as shown by a waveform (b) in FIG. 6 or 7. The average value $E_c$ and the light quantity signal $E_3$ are also applied to a comparator 21 to produce a signal $Q_2$ as shown by a waveform (c) in FIG. 6 or 7. The signals $Q_1$ and $Q_2$ are opposite in phase. The track error signal $E_1$ is applied to a comparator 22 operating at a level $E_a$ to produce a signal $R_1$ as shown by a waveform (d) in FIG. 6 or 7. The track error signal $E_1$ is also applied to a comparator 23 operating at a level $E_b$ to produce a signal $R_2$ as shown by a waveform (e) in FIG. 6 or 7. The signals $Q_1$ and $Q_2$ are inverted at inverters 24 and 25 and delayed by a proper time through delay lines 26 and 27 to obtain a signal $\overline{DQ_1}$ as shown by a waveform (f) in FIG. 6 or 7 and a signal $\overline{DQ_2}$ as shown by a waveform (g) in FIG. 6 or 7. The signals $Q_1$ and $\overline{DQ_1}$ are ANDed at an AND circuit 28 to produce a pulse $S_1$ as shown by a waveform (h) in FIG. 6 or 7 which represents an average level of a sinusoidal waveform indicative of a light quantity. Similarly, the signals $Q_2$ and $\overline{DQ_2}$ are ANDed at an AND circuit 29 to produce a pulse $S_2$ as shown by a waveform (i) in FIG. 6 or 7. The pulse $S_1$ or $S_2$ occurs approximately at a peak or a bottom of the track error signal $E_1$ and approximately corresponds to an edge portion of a track.

Where the jumping operation is started in a direction of an arrow as shown by the waveform (a') in FIG. 6, the signal $R_2$ assumes a logic "1" when the scanning light spot passes through a rear edge portion of a track at which excursion of the track error signal $E_1$ is at the bottom, and the pulse $S_2$ is produced in the middle of the bottom. This pulse $S_2$ is applied to a set terminal of a flip-flop circuit 41 through an AND circuit 39 operating under the control of AND circuits 33, 34, 35 and 36 and OR circuits 37 and 38, so that the flip-flop circuit 41 is driven to a logic "1" state. A reset terminal of the flip-flop circuit 41 is supplied with the pulse $S_1$.

If the light spot returns at the timing of the bottom of the track error signal $E_1$, the pulse $S_1$ occurs as shown in FIG. 7 and the flip-flop circuit 41 is reset to bring a $\overline{Q}$ output into a logic "1" state. On the other hand, the pulses $S_1$ and $S_2$ are ORed at an OR circuit 30 and delayed by a proper time through a delay line 31. The delayed pulse and the $\overline{Q}$ output of the flip-flop circuit 41 are ANDed at an AND circuit 43 to produce an output pulse H when the light spot returns in the course of the movement. By detecting the pulse H, failure of jumping can be determined. The pulse H may preferably be used for remedy for the failure such as restarting of the jumping operation. When a Q output (a waveform F/F as shown by (j) in FIG. 6 or FIG. 7) of the flip-flop circuit 41 assumes a logic "1" and thereafter occurrence of the output pulse F (FIG. 4) indicative of the middle point B between adjacent tracks which is extracted from the track error signal is detected by the usual programmable circuit (not shown), the light spot reaching the middle point between adjacent tracks can duly be determined.

When the light spot moves in a direction of an arrow as shown in FIG. 6, the polarity of current is changed by the signal indicative of the middle point B, and occurrence of the pulse $S_1$ during occurrence of the logic "1" of the signal $R_1$ is examined to judge whether the light spot passes through a front edge portion of an adjacent track at which excursion of the signal $E_1$ is at the next peak. A circuit for this purpose includes an AND circuit 40, a flip-flop circuit 42 and an AND circuit 44 as shown in FIG. 5. This circuit operates in a similar manner to the circuit arrangement described previously and will not be detailed herein. In particular, if the light spot returns at the timing of the peak of the track error signal $E_1$, the pulse $S_2$ occurs so that the AND circuit 44 produces an output pulse I. By detecting the pulse I, failure of jumping can be determined. The pulse I may be used for remedy for the failure such as restarting of the jumping operation.

When the light spot moves in a direction of an arrow as shown in FIG. 7, the peak of the signal $E_1$ corresponds to the rear edge of the track to be scanned and the bottom of the signal $E_1$ corresponds to the front edge of the track. Accordingly, where occurrence of the pulse $S_2$ is examined during occurrence of the logic "1" state of the signal $R_1$ with the circuit of FIG. 5, the output pulse H is produced when the light spot returns from the rear edge of the track corresponding to the peak of the signal $E_1$. On the other hand, where occurrence of the pulse $S_1$ is examined during occurrence of the logic "1" state of the signal $R_2$, the output pulse I is produced when the light spot returns from the front edge of the adjacent track corresponding to the bottom of the signal $E_1$. In this manner, failure of the jumping operation can be determined.

Figure 8A:
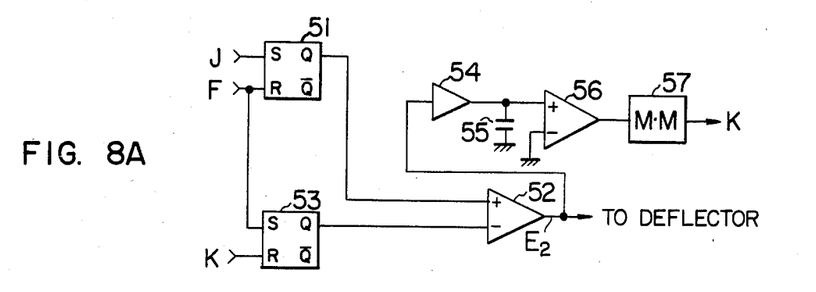
FIG. 8A shows an arrangement forming a further part of the invention for changing the polarity of a control signal applied to a light spot controller.
Figure 8B:
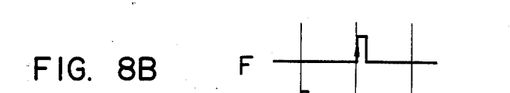
FIGS. 8B through 8F show waveforms for explaining the operation of the arrangement of FIG. 8A.
Figures 8C, 8D:
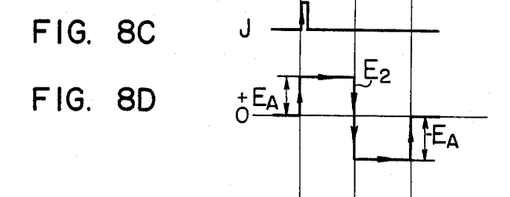
Figure 8E:
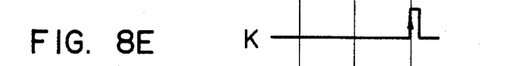
Figure 8F:
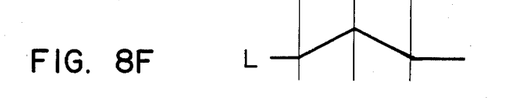

Referring now to FIG. 8A a circuit arrangement adapted to control the polarity and duration period of the control signal $E_2$ in response to the timing signal F will be described, which circuit arrangement has not yet been described previously. A start signal J for the jumping operation as shown in FIG. 8C is applied to a set terminal of a flip-flop circuit 51 to set the same. A Q output of the flip-flop circuit 51 is applied to a (+) input terminal of a differential amplifier 52. An output $E_2$ therefrom has a height $E_A$ in a (+) direction as shown in FIG. 8D and it drives a device for displacing the light spot (for example, an actuator for tracking such as a deflector in the form of a galvano-mirror or a swing arm) to accelerate the light spot from point A to point C. When the light spot passes through the middle point B between adjacent tracks, the signal F as shown in FIG. 8B is produced as explained previously. This signal F is applied to a reset terminal of the flip-flop circuit 51 to reset the same. The signal F is also applied to a set terminal of a flip-flop circuit 53 to set the same. A Q output of the flip-flop circuit 53 is applied to a (−) input terminal of the differential amplifier 52 to produce a signal having a height $-E_A$ in a (−) direction as shown in FIG. 8D. Thus, the signal $E_2$ has the same magnitude of height (level) in positive and negative directions. The negative height $-E_A$ of the signal $E_2$ decelerates the light spot being present at the middle point B. On the other hand, the signal $E_2$ charges or discharges a capacitor 55 through a buffer amplifier 54. More particularly, the capacitor 55 is charged only during the acceleration and its potential assumes a signal waveform L as shown in FIG. 8F which increases in accordance with a specified time constant to reach a potential at the middle point B. During the subsequent deceleration, the capacitor 55 discharges in accordance with the specified time constant. The signal L is applied to a comparator 56 to detect a timing at which the discharging potential intersects a zero level. An output of the comparator 56 is applied to a monostable multivibrator 57 to produce a signal K as shown in FIG. 8E which rises in response to the zero-cross point of the comparator 56 and has a predetermined pulse width. The signal K is applied to the flip-flop 53 to reset it. In this manner, the acceleration period is made equal to the deceleration period.

Various devices for controlling the polarity and duration period of the control signal $E_2$ are disclosed in Japanese Patent application Laid-Open No. 52-26802 mentioned previously. Any devices disclosed therein may be applied to the present invention.

As has been described, according to the invention, the zero point of the track error signal employed for changing drive current of the deflector can be detected accurately. In addition, even in the event that the light spot returns in the course of the movement under the influence of defect of the deflector or external disturbance exerted on the disk, the return of the light spot can be detected for remedy therefor such as restarting of the jumping operation, thereby improving reliability of the jumping operation.

We claim:

1. A device for generating a light spot control signal for jumping a light spot on a track of a recording medium comprising:
   error signal detecting means for generating an error signal representative of positions of a light spot relative to tracks, from a light beam irradiated on a recording medium having said tracks on which information is recorded;
   means for generating a control signal for moving the light spot in a desired direction;
   timing signal detecting means for detecting from the error signal a timing signal representative of an instant at which the light spot is present at the middle point between adjacent tracks, said timing signal detecting means including first means for providing, from the error signal, first pulse outputs in opposite phases which change at zero points of said error signal, second means for providing second pulse outputs representative of times when each of the first pulse outputs rise, and third means for selecting one of the second pulse outputs in accordance with the desired direction and delivering the selected pulse output as the timing signal; and
   means for controlling the polarity of said control signal in response to said timing signal, whereby said control signal jumps the light spot from a track being scanned thereby to an adjacent track.

2. A light spot control signal generating device according to claim 1 wherein said first means comprises first and second comparators which compare the error signal with reference values set for the respective comparators; said second means comprises first and second processing circuits for delaying and inverting pulse outputs from said first and second comparators, and first and second logic circuits for ANDing an output of said first processing circuit and the pulse output of said first comparator and an output of said second processing circuit and the pulse output of said second comparator; and said third means comprises a third logic circuit for delivering one of the outputs of said first and second logic circuits in accordance with a signal representative of said desired direction.

3. A device for generating a light spot control signal for jumping a light spot on a track of a recording medium comprising:
   means for generating a signal representative of light quantity of a light beam and an error signal representative of positions of a light spot relative to tracks, from the light beam irradiated on a recording medium having said tracks on which information is recorded;
   means for generating a control signal for moving the light spot in a desired direction;
   first detecting means for detecting from the signal representative of the light quantity a first timing signal representative of an instant at which the light spot is present at an edge of the track;
   judging means for judging from the first timing signal and the error signal whether the light spot passes through said tracks in the desired direction;
   second detecting means for detecting from said error signal a second timing signal representative of an instant at which the light spot is present at the middle point between adjacent tracks; and
   means for controlling the polarity of said control signal in response to said second timing signal, whereby said control signal jumps the light spot from a track being scanned thereby to an adjacent track.

4. A light spot control signal generating device according to claim 3 wherein said first detecting means comprises first means for providing, from the signal representative of the light quantity, first pulse outputs in opposite phases which vary with respect to their average values, and second means for generating, from the first pulse outputs, second pulse outputs representative of times when said first pulse outputs rise as said first timing signal; and said judging means comprises third means for generating from the error signal pulse outputs representative periods during which the light spot passes through an edge of the track, and fourth means responsive to the outputs of said third means and the outputs of said second means; for generating a signal representative of the fact that the light spot passes through the edge of the track in a direction opposite to the desired direction.

5. A light spot control signal generating device according to claim 4 therein said fourth means comprises a first flip-flop circuit supplied with the second pulse outputs of said second means to produce a pulse output which falls in response to one of the second pulse outputs and rises in response to the other, a second flip-flop circuit supplied with the second pulse outputs of said second means to produce a pulse output which rises in response to one of the second pulse outputs falls in response to the other, a first logic circuit responsive to the pulse outputs of said third means and the signal representative of the desired direction to apply one of the pulse outputs of said second means to the first flip-flop circuit and the other to the second flip-flop circuit, a first delay circuit for delaying the pulse outputs of said second means, a second logic circuit for ANDing an output of the first delay circuit and an output of the first flip-flop circuit, and a third logic circuit for ANDing the output of the first delay circuit and an output of the second flip-flop circuit.

6. A light spot control signal generating device according to claim 4 wherein said first means comprises first and second comparators which compare the signal representative of the light quantity with an average value of the light quantity signal, and said second means comprises first and second processing circuits for inverting and delaying pulse outputs of the first and second comparators, a fourth logic circuit for ANDing an output of the first processing circuit and the pulse output of said first comparator, and a fifth logic circuit for ANDing an output of the second processing circuit and the pulse output of said second comparator.

7. A light spot control signal generating device according to claim 4 wherein said second detecting means comprises fifth means for providing, from the error signal, fifth pulse outputs in opposite phases which change at zero points of said error signal, sixth means for providing sixth pulse outputs representative of times when each of the fifth pulse outputs rises, and seventh means for selecting one of the sixth pulse outputs in accordance with the desired direction and delivering the selected pulse output as the second timing signal.

8. A light spot control signal generating device according to claim 6, wherein said second detecting means includes fifth means for providing, from the error signal, first pulse outputs in opposite phases which change at zero points of said error signal, sixth means for providing second pulse outputs representative of times when each of the first pulse outputs rises, and seventh means for selecting one of the second pulse outputs in accordance with the desired direction and providing the selected pulse output as the second timing signal.

9. A light spot control signal detecting device according to claim 8 wherein said fifth means comprises fifth and sixth comparators which compare the error signal with reference values set for the respective comparators; and said sixth means comprises third and fourth processing circuits for delaying and inverting pulse outputs from said fifth and sixth comparators, and sixth and seventh logic circuits for ANDing an output of said third processing circuit and the pulse output of said fifth comparator and an output of said fourth processing circuit and the pulse output of said sixth comparator.

10. A light spot control signal generating device according to claim 3, wherein said second detecting means includes first means for providing, from the error signal, first pulse outputs in opposite phases which change at zero points of said error signal, second means for providing second pulse outputs representative of times when each of the first pulse outputs rises, and third means for selecting one of the second pulse outputs in accordance with the desired direction and providing the selected pulse output as the second timing signal.

11. A light spot control signal generating device according to claim 10, wherein said first means comprises first and second comparators which compare the error signal with reference values set for the respective comparators; and said second means comprises first and second processing circuits for delaying and inverting pulse outputs from said first and second comparators, and first and second logic circuits for ANDing an output of said first processing circuit and the pulse output of said first comparator and an output of said second processing circuit and the pulse output of said second comparator.

12. A light spot control signal generating device according to claim 11, wherein said first detecting means comprises fourth means for providing, from the signal representative of the light quantity, third pulse outputs in opposite phases which vary with respect to their average values, and fifth means for generating, from the third pulse outputs, fourth pulse outputs representative of times when said third pulse outputs rise as said first timing signal; and said judging means comprises sixth means for generating from the error signal pulse outputs representative of periods during which the light spot passes through an edge of the track, and seventh means responsive to the outputs of said sixth means and the outputs of said fifth means, for generating a signal representative of the fact that the light spot passes through the edge of the track in a direction opposite to the desired direction.

13. A light spot control signal generating device according to claim 12, wherein said seventh means comprises a first flip-flop circuit supplied with the fourth pulse outputs of said fifth means to produce a pulse output which falls in response to one of the fourth pulse outputs and rises in response to the other, a second flip-flop circuit supplied with the fourth pulse outputs of said fifth means to produce a pulse output which rises in response to one of the fourth pulse outputs and which falls in response to the other, a third logic circuit responsive to the pulse outputs of said sixth means to apply one of the pulse outputs of said fifth means to the first flip-flop circuit and the other to the second flip-flop circuit, a first delay circuit for delaying the pulse outputs of said fifth means, a fourth logic circuit for ANDing and output of the first delay circuit and an output of the first flip-flop circuit, and a fifth logic circuit for ANDing the output of the first delay circuit and an output of the second flip-flop circuit.

14. A light spot control signal generating device according to claim 12, wherein said fourth means comprises first and second comparators which compare the signal representative of the light quantity with an average value of the light quantity signal, and said fifth means comprises first and second processing circuits for inverting and delaying pulse outputs of the first and second comparators, a sixth logic circuit for ANDing an output of the first processing circuit of said fifth means and the pulse output of said first comparator of said fourth means, and a seventh logic circuit for ANDing an output of the second processing circuit of said fifth means and the pulse output of said second comparator of said fourth means.

* * * * *